(12) United States Patent
Chen et al.

(10) Patent No.: US 12,710,648 B2
(45) Date of Patent: Aug. 18, 2026

(54) LIGHT BEAM PROCESSING APPARATUS AND LIGHT BEAM PROCESSING METHOD

(71) Applicant: Yinwang Intelligent Technologies Co., Ltd., Shenzhen (CN)

(72) Inventors: Yuchen Chen, Dongguan (CN); Shimao Li, Shenzhen (CN); Bing Zou, Shenzhen (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 280 days.

(21) Appl. No.: 18/496,505

(22) Filed: Oct. 27, 2023

(65) Prior Publication Data

US 2024/0061241 A1 Feb. 22, 2024

Related U.S. Application Data

(63) Continuation of application No. PCT/CN2022/076720, filed on Feb. 18, 2022.

(30) Foreign Application Priority Data

Apr. 29, 2021 (CN) ......................... 202110473908.4

(51) Int. Cl.
*G02B 27/01* (2006.01)
*G02B 27/28* (2006.01)

(52) U.S. Cl.
CPC ....... *G02B 27/0101* (2013.01); *G02B 27/286* (2013.01)

(58) Field of Classification Search
CPC .......................... G02B 27/286; G02B 27/0101
See application file for complete search history.

(56) References Cited

U.S. PATENT DOCUMENTS 10,495,798 B1 * 12/2019 Peng ...................... G02B 27/01
2003/0086066 A1 * 5/2003 Kato .................... G03B 21/208 353/20

(Continued)

FOREIGN PATENT DOCUMENTS

CN 1415980 A 5/2003
CN 1577049 A 2/2005

(Continued)

OTHER PUBLICATIONS

CN_105278224_A (English translation) (Year: 2016).*
CN_112470058_A (English translation) (Year: 2021).*
CN_118759789_A (English translation) (Year: 2024).*

*Primary Examiner* — Thomas A Hollweg
*Assistant Examiner* — Mary A El-Shammaa
(74) *Attorney, Agent, or Firm* — Leydig, Voit & Mayer, Ltd.

(57) ABSTRACT

A light beam processing apparatus and a light beam processing method are described that improve utilization of the light beam. The light beam processing apparatus includes a light source, a polarization converter, and a polarizer. The light source is configured to provide a first light beam. The first light beam includes a second light beam in a first polarization state and a third light beam in a second polarization state. The polarizer is configured to transmit the second light beam and reflect the third light beam to the polarization converter. The polarization converter is configured to convert the third light beam into a fourth light beam. The fourth light beam is utilized for obtaining a fifth light beam in the first polarization state. The polarizer is further configured to transmit the fifth light beam.

13 Claims, 11 Drawing Sheets

(56) References Cited

U.S. PATENT DOCUMENTS

2005/0185140 A1* 8/2005 Matsubara ......... G03B 21/2073
353/20
2011/0051092 A1* 3/2011 Mashitani ............. G02B 30/25
353/8
2018/0348515 A1* 12/2018 Kuzuhara ............ B60K 35/231
2020/0382751 A1* 12/2020 Guo .................. G03B 21/2073
2022/0276499 A1* 9/2022 Wang .................. G02B 5/1814

FOREIGN PATENT DOCUMENTS

CN 105278224 A * 1/2016
CN 111367140 A 7/2020
CN 112470058 A * 3/2021 ......... G02F 1/13718
CN 118759789 A * 10/2024 ............. G02B 27/48
WO WO-2024184100 A1 * 9/2024 ........... G02B 27/286
WO WO-2024231131 A1 * 11/2024 ......... G03B 21/2073

* cited by examiner

LIGHT BEAM PROCESSING APPARATUS AND LIGHT BEAM PROCESSING METHOD

CROSS-REFERENCE TO RELATED APPLICATIONS

This application is a continuation of International Application No. PCT/CN2022/076720, filed on Feb. 18, 2022, which claims priority to Chinese Patent Application No. 202110473908.4, filed on Apr. 29, 2021. The disclosures of the aforementioned applications are hereby incorporated by reference in their entireties

TECHNICAL FIELD

Embodiments of this application relate to the optical field, and in particular, to a light beam processing apparatus and a light beam processing method.

BACKGROUND

A projector is a display device that can provide a projection picture. A light source is disposed inside the projector, and the light source is configured to provide a light beam. A liquid crystal on silicon in the projector may modulate the light beam. Finally, a modulated light beam passes through a projection lens, so that an image is displayed.

However, the liquid crystal on silicon can modulate only light in a single polarization state, and the light beam provided by the light source is non-polarized light, where the non-polarized light has two polarization states. Therefore, the liquid crystal on silicon can modulate only light in one polarization state of the light beam, but cannot modulate light in another polarization state, resulting in low utilization of the light beam.

SUMMARY

Embodiments of this application provide a light beam processing apparatus and a light beam processing method, to improve utilization of the light beam.

A first aspect of embodiments of this application provides a light beam processing apparatus. The light beam processing apparatus includes a light source, a polarization converter, and a polarizer. The light source is configured to provide a first light beam, where the first light beam includes a second light beam in a first polarization state and a third light beam in a second polarization state, and the first polarization state and the second polarization state are two orthogonal polarization states. The first light beam is transmitted from the light source to the polarizer. The polarizer may transmit a light beam in the first polarization state and reflect a light beam in the second polarization state. Therefore, the polarizer transmits the second light beam, and reflects the third light beam to the polarization converter. The polarization converter converts the third light beam into a fourth light beam. The fourth light beam may be for obtaining a fifth light beam in the first polarization state. The polarizer may further transmit the fifth light beam.

In embodiments of this application, the polarization converter may convert the third light beam in the second polarization state into the fourth light beam, and obtain, based on the fourth light beam, the fifth light beam in the first polarization state. Because the light beam in the second polarization state cannot be modulated by a liquid crystal on silicon, in embodiments of this application, a polarization state of a light beam is converted. This improves utilization of the light beam.

In a possible implementation, the polarization converter may be specifically a light guide, and the light source may be disposed inside the light guide, the third light beam is totally reflected in the light guide, and is converted into the fourth light beam, where the fourth light beam includes the fifth light beam and a sixth light beam that is in the second polarization state. The polarizer transmits the fifth light beam, and the polarizer may further reflect the sixth light beam to the light guide.

In embodiments of this application, the third light beam and the sixth light beam that are in the second polarization state are totally reflected multiple times, to implement polarization state conversion. This improves the utilization of the light beam.

In a possible implementation, a light emitting direction of the light source may be parallel to a transmission direction of the first light beam, or a light emitting direction of the light source may be perpendicular to a transmission direction of the first light beam.

In a possible implementation, the polarization converter may be specifically a depolarizer, and the fourth light beam includes the fifth light beam and a sixth light beam that is in the second polarization state. The polarizer transmits the fifth light beam, and the polarizer may further reflect the sixth light beam to the light guide.

In embodiments of this application, the depolarizer may directly convert the third light beam into the fourth light beam without total reflection. This improves the utilization of the light beam and improves light beam processing efficiency.

In a possible implementation, the polarization converter may be specifically a quarter-wave plate, the quarter-wave plate may convert the third light beam into the fourth light beam, and the fourth light beam is circularly polarized light. Then, the quarter-wave plate completely converts the circularly polarized light into the fifth light beam in the first polarization state.

In embodiments of this application, the quarter-wave plate can completely convert the third light beam into the fifth light beam in the first polarization state. This further improves the utilization of the light beam and improves the light beam processing efficiency.

In a possible implementation, a light emitting direction of the light source is parallel to a propagation direction of the first light beam.

In a possible implementation, the light beam processing apparatus further includes a fly's-eye lens. The fly's-eye lens may homogenize the second light beam and the fifth light beam, to obtain a homogenized second light beam and a homogenized fifth light beam.

In a possible implementation, the light beam processing apparatus further includes an integrator lens. The integrator lens may focus the second light beam and the fifth light beam, to obtain a focused second light beam and a focused fifth light beam. Alternatively, the integrator lens may focus the homogenized second light beam and the homogenized fifth light beam, to obtain a focused second light beam and a focused fifth light beam.

In a possible implementation, the light beam processing apparatus further includes an opto-mechanical system. The opto-mechanical system may modulate the focused second light beam and the focused fifth light beam. Alternatively, the opto-mechanical system may modulate the homogenized second light beam and the homogenized fifth light beam.

In a possible implementation, the light source may be a light-emitting diode or a semiconductor laser emitter.

In a possible implementation, the polarizer may be a multi-layer thin film polarizer or a metal wire grate polarizer.

A second aspect of embodiments of this application provides a head-up display. The head-up display includes an aspherical lens, a windshield, and the light beam processing apparatus in the first aspect. The aspherical lens and the windshield may be for reflecting a light beam projected by the light beam processing apparatus.

A third aspect of embodiments of this application provides a light beam processing method. First, a first light beam is provided, where the first light beam includes a second light beam in a first polarization state and a third light beam in a second polarization state. Then, the second light beam is transmitted, and the third light beam is reflected. To obtain more light beams in the first polarization state, the third light beam is converted into a fourth light beam, where the fourth light beam may be for obtaining a fifth light beam in the first polarization state, and then the fifth light beam is transmitted.

In embodiments of this application, the third light beam in the second polarization state may be converted into the fourth light beam, and the fifth light beam in the first polarization state is obtained based on the fourth light beam. Because a light beam in the second polarization state cannot be modulated by a liquid crystal on silicon, in embodiments of this application, a polarization state of a light beam is converted. This improves utilization of the light beam.

In a possible implementation, a polarization state of the third light beam may be changed through total reflection of the third light beam. The third light beam is converted into the fourth light beam, where the fourth light beam includes the foregoing fifth light beam and a sixth light beam that is in the second polarization state, and then, the sixth light beam may be further reflected.

In embodiments of this application, the third light beam and the sixth light beam that are in the second polarization state are totally reflected multiple time, to implement polarization state conversion. This improves utilization of the light beam.

In a possible implementation, the fourth light beam includes the foregoing fifth light beam and the sixth light beam that is in the second polarization state, and then the sixth light beam may be further reflected.

In embodiments of this application, the third light beam and the sixth light beam that are in the second polarization state may be converted into light beams in the first polarization state. Because a light beam in the second polarization state cannot be modulated by a liquid crystal on silicon, in embodiments of this application, a polarization state of a light beam is converted. This improves the utilization of the light beam.

In a possible implementation, the third light beam may be first converted into a circularly polarized light beam, where the circularly polarized light beam is the fourth light beam, and then, the circularly polarized light beam is converted into the foregoing fifth light beam.

In embodiments of this application, the fourth light beam in a circular polarization state may be directly converted into the fifth light beam in the first polarization state. This improves light beam processing efficiency.

In a possible implementation, the second light beam and the fifth light beam may be homogenized, to obtain a homogenized second light beam and a homogenized fifth light beam.

In a possible implementation, the second light beam and the fifth light beam may be focused, to obtain a focused second light beam and a focused fifth light beam. Alternatively, the homogenized second light beam and the homogenized fifth light beam may be focused, to obtain a focused second light beam and a focused fifth light beam.

In a possible implementation, the focused second light beam and the focused fifth light beam may be modulated, or the homogenized second light beam and the homogenized fifth light beam may be modulated.

DESCRIPTION OF EMBODIMENTS

The following describes embodiments of this application with reference to the accompanying drawings. It is clear that the described embodiments are merely some rather than all of embodiments of this application. A person of ordinary skill in the art may know that with development of technologies and emergence of new scenarios, the technical solutions provided in embodiments of this application are also applicable to resolving similar technical problems.

In the specification, claims, and accompanying drawings of this application, the terms "first", "second", and the like are intended to distinguish between similar objects but do not necessarily indicate a specific order or sequence. It should be understood that the data used in such a way are interchangeable in proper circumstances, so that embodiments described herein can be implemented in other orders than the order illustrated or described herein. Moreover, the terms "include", "have", and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

Embodiments of this application provide a light beam processing apparatus, to improve utilization of a light beam.

Figure 1A:
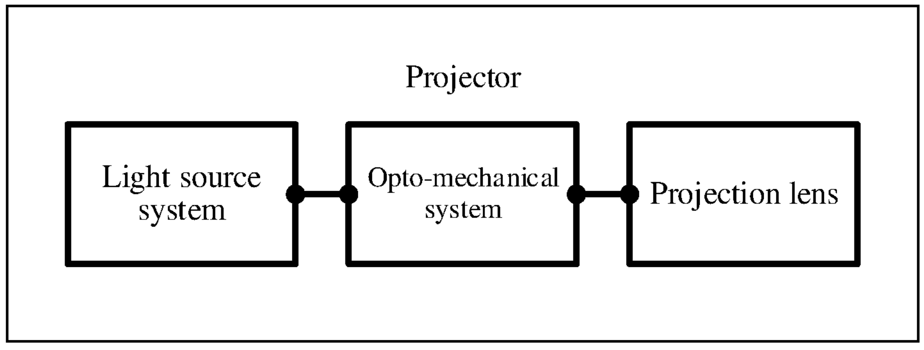
FIG. 1*a* is a schematic diagram of a structure of a projector according to an embodiment of this application.

Embodiments of this application may be applicable to a projector. Referring to FIG. 1*a*, the projector mainly includes three parts: a light source system, an opto-mechanical system, and a projection lens. The light source system is configured to provide a light beam. The opto-mechanical system modulates the light beam based on a required image, and transmits a modulated light beam to the projection lens. Finally, external imaging is implemented.

The projector is provided with a plurality of optical elements inside. When a light beam penetrates a surface of the optical element at a non-vertical angle, both a reflection characteristic and a transmission characteristic of the light beam depend on a polarization phenomenon. A plane that includes an incident light beam, a reflected light beam, a refracted light beam, and a normal line is used as a reference plane. If a polarization vector of the light beam is within the reference plane, it is referred to as a P polarization state. If the polarization vector of the light beam is perpendicular to the reference plane, it is referred to as an S polarization state. In a projector, a light beam provided by a light source may include a light beam in the P polarization state and a light beam in the S polarization state. However, a liquid crystal on silicon usually modulates a light beam in one of the foregoing polarization state light beams of the P polarization state and the light beam in the S polarization state. The light beam processing apparatus in embodiments of this application may perform polarization state conversion on the light beam via a polarization converter. This improves utilization of the light beam.

In embodiments of this application, the polarization converter of the light beam processing apparatus may be any one of a light guide, a depolarizer, and a quarter-wave plate. The following separately describes the polarization converter in detail.

Figure 1B:
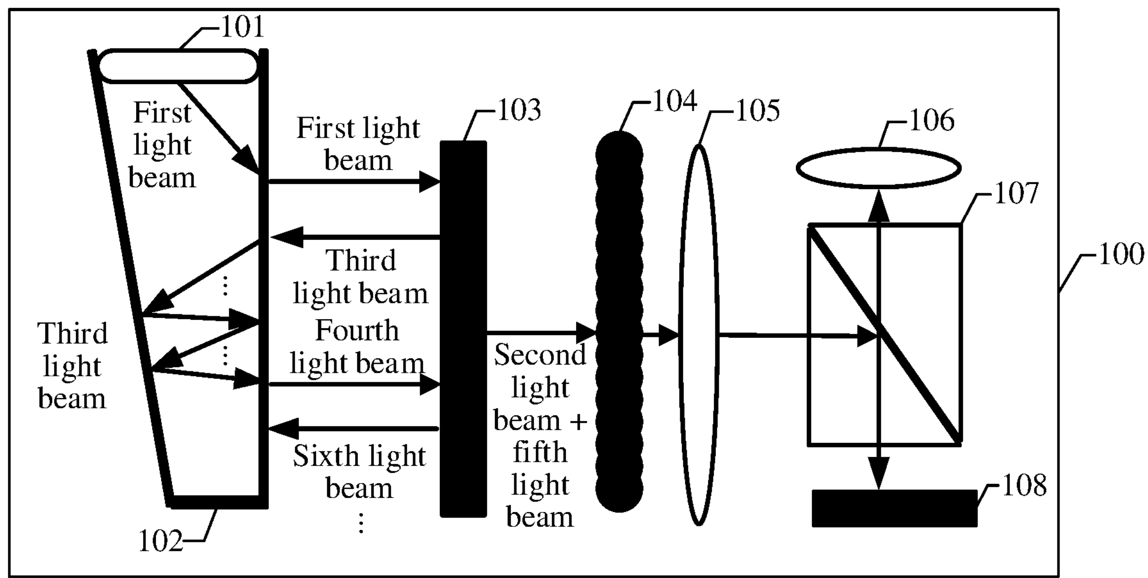
FIG. 1*b* is a schematic diagram of a structure of a light beam processing apparatus according to an embodiment of this application.

Referring to FIG. 1*b*, the following describes a structure of a light beam processing apparatus 100 in embodiments of this application. In the structure, a polarization converter is a light guide.

The light beam processing apparatus 100 in embodiments of this application includes a light source 101, a light guide 102, a polarizer 103, a fly's-eye lens 104, an integrator lens 105, a liquid crystal on silicon 108, a polarized light splitter 107, and a projection lens 106. An opto-mechanical system includes the liquid crystal on silicon 108 and the polarized light splitter 107.

The following describes components of the light beam processing apparatus 100 in embodiments of this application in detail with reference to a transmission path of light.

As shown in FIG. 1*b*, the light source 101 provides a first light beam, where the first light beam includes a second light beam in a first polarization state and a third light beam in a second polarization state.

The first light beam is transmitted from the light source 101 to the light guide 102, and is transmitted to the polarizer 103 through the light guide 102. The polarizer 103 is an optical element, and may transmit a light beam in the first polarization state, and reflect a light beam in the second polarization state. The first light beam is transmitted to the polarizer 103, where the polarizer 103 transmits the second light beam and reflects the third light beam to the light guide 102. After returning to the light guide 102, the third light beam is totally reflected in the light guide 102. After being totally reflected, the third light beam in the second polarization state is converted into a fourth light beam, where the fourth light beam includes a fifth light beam in the first polarization state and a sixth light beam in the second polarization state.

The fourth light beam is transmitted to the polarizer 103 through the light guide 102, where the polarizer 103 transmits the fifth light beam, and reflects the sixth light beam to the light guide 102. It should be noted that the foregoing description of the light beam processing apparatus 100 is a simple example. During actual implementation, after returning to the light guide 102, the sixth light beam is also totally reflected and converted into a light beam including a light beam in the first polarization state and a light beam in the second polarization state. The light beam is further transmitted to the polarizer 103 through the light guide 102. In this way, the light beam that is in the second polarization state and reflected by the polarizer 103 to the light guide 102 can be converted into a light beam including a light beam in the first polarization state and a light beam in the second polarization state, to continuously obtain light beams in the first polarization state.

During actual implementation, the light source 101 may provide a continuous light beam. Therefore, a cavity between the light guide 102 and the polarizer 103 includes both the light beam transmitted from the light guide 102 to the polarizer 103 and the light beam reflected from the polarizer 103 to the light guide 102. Intensity of the light beam transmitted by the polarizer 103 may also be constant.

Still referring to FIG. 1*b*, the second light beam and the fifth light beam transmitted by the polarizer 103, that is, light beams in the first polarization state, are transmitted from the polarizer 103 to the fly's-eye lens 104. The fly's-eye lens 104 homogenizes the second light beam and the fifth light beam, to obtain a homogenized second light beam and a homogenized fifth light beam. The homogenized second light beam and the homogenized fifth light beam are transmitted to the integrator lens 105, and the integrator lens 105 focuses the homogenized second light beam and the homogenized fifth light beam to obtain a focused second light beam and a focused fifth light beam. The focused second light beam and the focused fifth light beam are transmitted to the opto-mechanical system.

After the focused second light beam and the focused fifth light beam are transmitted to the opto-mechanical system, the polarized light splitter 107 reflects the focused second light beam and the focused fifth light beam to the liquid crystal on silicon 108. The liquid crystal on silicon 108 performs pixel-level polarization state processing on the focused second light beam and the focused fifth light beam, to modulate a to-be-displayed image into the second light beam and the fifth light beam on which the polarization state processing is performed. For example, pixel-level polarization state conversion may be performed on the focused second light beam and the focused fifth light beam. The liquid crystal on silicon 108 includes a target pixel area and a non-target pixel area. No polarization state conversion occurs in a light beam corresponding to the non-target pixel area, and polarization state conversion occurs in a light beam corresponding to the target pixel area. The light beam on which the polarization state conversion occurs is reflected by the liquid crystal on silicon 108 to the polarized light splitter 107, and transmits the polarized light splitter 107. Specifically, Transmittance of the light beam depends on a grayscale value of the target pixel area, and the greater the grayscale value, the higher the transmittance. The light beam transmitted by the polarized light splitter 107 is transmitted to the projection lens 106 to implement external imaging.

Figure 2:
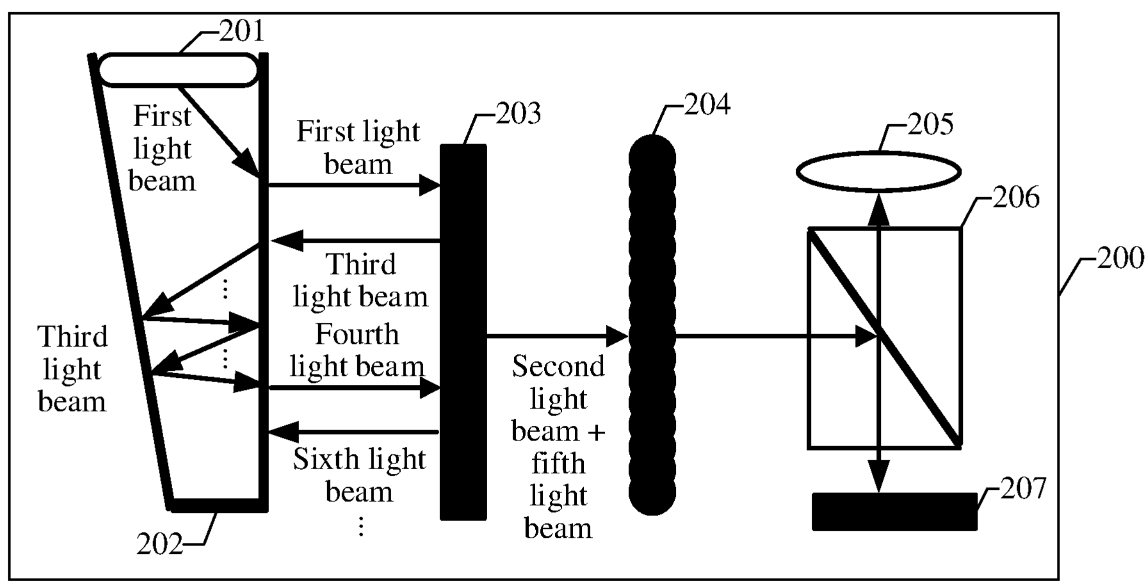
FIG. 2 is another schematic diagram of a structure of a light beam processing apparatus according to an embodiment of this application.

It should be noted that, referring to FIG. 2, a structure of a light beam processing apparatus 200 in embodiments of this application may not include an integrator lens. A fly's-eye lens 204 transmits a homogenized second light beam and a homogenized fifth light beam to an opto-mechanical system. The opto-mechanical system may modulate the homogenized second light beam and the homogenized fifth light beam. A specific modulation manner is similar to the foregoing manner of modulating a focused second light beam and a focused fifth light beam, and details are not described herein again.

Figure 3:
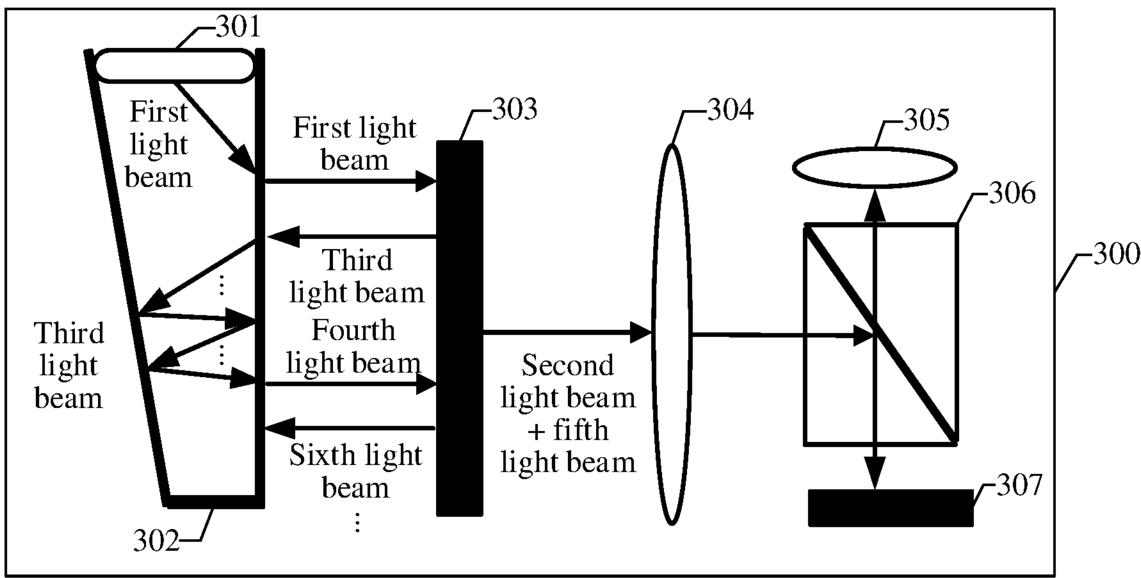
FIG. 3 is another schematic diagram of a structure of a light beam processing apparatus according to an embodiment of this application.

Alternatively, referring to FIG. 3, a structure of the light beam processing apparatus 300 in embodiments of this application may not include a fly's-eye lens, and an integrator lens 304 directly focuses a second light beam and a fifth light beam, to obtain a focused second light beam and a focused fifth light beam. Then, an opto-mechanical system modulates the focused second light beam and the focused fifth light beam. A specific modulation manner is not described herein again.

It should be noted that, the first polarization state is a P polarization state, and the second polarization state is an S polarization state. Alternatively, the first polarization state is an S polarization state, and the second polarization state is a P polarization state. This is not specifically limited herein. The light source 101, a light source 201, and a light source 301 may be light-emitting diodes, or may be semiconductor laser emitters. This is not specifically limited herein. Light emitting directions of the light source 101, the light source 201, and the light source 301 may be parallel to a transmission direction of the first light beam. Light emitting directions of the light source 101, the light source 201, and the light source 301 may alternatively be perpendicular to a transmission direction of the first light beam. This is not specifically limited herein. The polarizer 103, a polarizer 203, and a polarizer 303 may be a multi-layer thin film polarizer or a metal wire grate polarizer. This is not specifically limited herein.

In embodiments of this application, the polarizer may reflect the light beam in the second polarization state back to the light guide, and after being totally reflected in the light guide, the light beam in the second polarization state is converted into a light beam including a light beam in the first polarization state and a light beam in the second polarization state, to continuously obtain light beams in the first polarization state. This improves utilization of the light beam provided by the light source.

The following describes a structure in which a polarization converter is a depolarizer in a light beam processing apparatus according to embodiments of this application.

Figure 4:
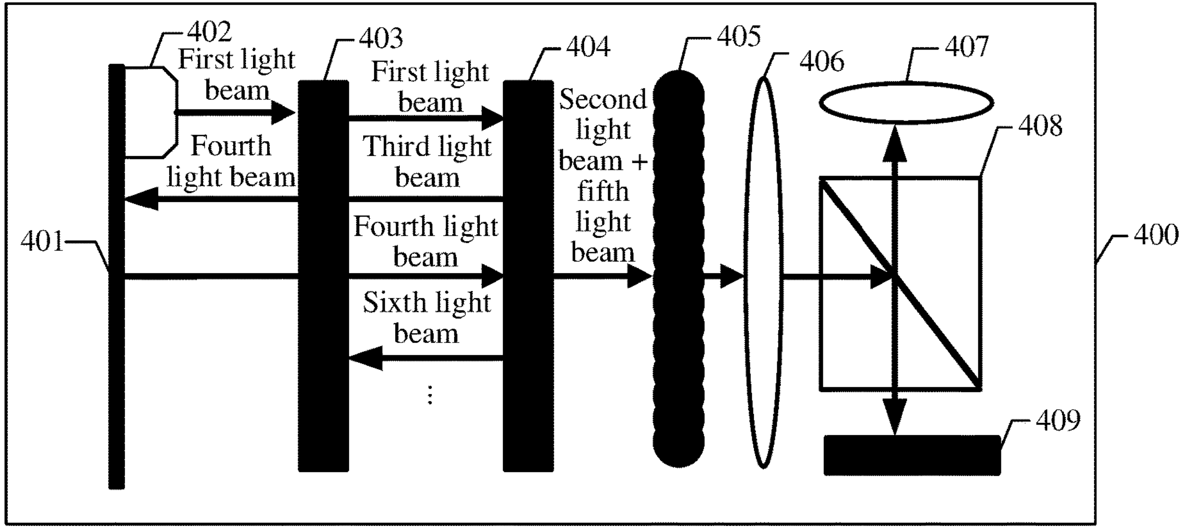
FIG. 4 is another schematic diagram of a structure of a light beam processing apparatus according to an embodiment of this application.

Referring to FIG. 4, a structure of a light beam processing apparatus 400 in embodiments of this application includes a light source 402, a reflection coating 401, a depolarizer 403, a polarizer 404, a fly's-eye lens 405, an integrator lens 406, a polarized light splitter 408, a projection lens 407, and a liquid crystal on silicon 409. An opto-mechanical system includes the polarized light splitter 408 and the liquid crystal on silicon 409. The following describes components of the light beam processing apparatus in embodiments of this application in detail with reference to a transmission path of light.

As shown in FIG. 4, the light source 402 provides a first light beam, where the first light beam includes a second light beam in a first polarization state and a third light beam in a second polarization state.

The first light beam is transmitted from the light source 402 to the depolarizer 403, and then to the polarizer 404. The polarizer 404 transmits the second light beam, and reflects the third light beam to the depolarizer 403. The depolarizer 403 may convert the third light beam into a fourth light beam, where the fourth light beam includes a fifth light beam in the first polarization state and a sixth light beam in the second polarization state. The fourth light beam is transmitted through the depolarizer 403 to the reflection coating 401 disposed at the light source 402. The reflection coating 401 reflects the fourth light beam to the polarizer 404.

The polarizer 404 transmits the fifth light beam, and reflects the sixth light beam to the depolarizer 403. It should be noted that, the foregoing description of the light beam processing apparatus 400 is a simple example. During actual implementation, after the sixth light beam is reflected to the depolarizer 403, and is also converted into a light beam including a light beam in the first polarization state and a light beam in the second polarization state. The light beam is also transmitted to the polarizer 404 through the reflection coating 401. In this way, the light beam that is in the second polarization state and reflected by the polarizer 404 to the depolarizer 403 can be converted into a light beam including a light beam in the first polarization state and a light beam in the second polarization state, to continuously obtain light beams in the first polarization state.

During actual implementation, the light beam provided by the light source 402 may be continuous. Therefore, a cavity between the depolarizer 403 and the polarizer 404 includes both the light beam transmitted from the depolarizer 403 to the polarizer 404 and the light beam reflected from the polarizer 404 to the depolarizer 403. Intensity of the light beam transmitted by the polarizer 404 may also be constant.

Still referring to FIG. 4, the second light beam and the fifth light beam transmitted by the polarizer 404, that is, light beams in the first polarization state, are transmitted from the polarizer 404 to the fly's-eye lens 405, and then to the integrator lens 406. The fly's-eye lens 405 is similar to the fly's-eye lens 104 in the embodiment shown in FIG. 1*b*, and the integrator lens 406 is similar to the integrator lens 105 in the embodiment shown in FIG. 1*b*. Details are not described herein again.

After a focused second light beam and a focused fifth light beam are transmitted to the opto-mechanical system, the polarized light splitter 408 reflects the focused second light beam and the focused fifth light beam to the liquid crystal on silicon 409. The liquid crystal on silicon 409 performs pixel-level polarization state processing on the focused second light beam and the focused fifth light beam based on an actually required image, to modulate a to-be-displayed image into the second light beam and the fifth light beam on which the polarization state processing is performed. A specific modulation manner is similar to the modulation manner in the embodiment shown in FIG. 1*b*, and details are not described herein again.

Figure 5:
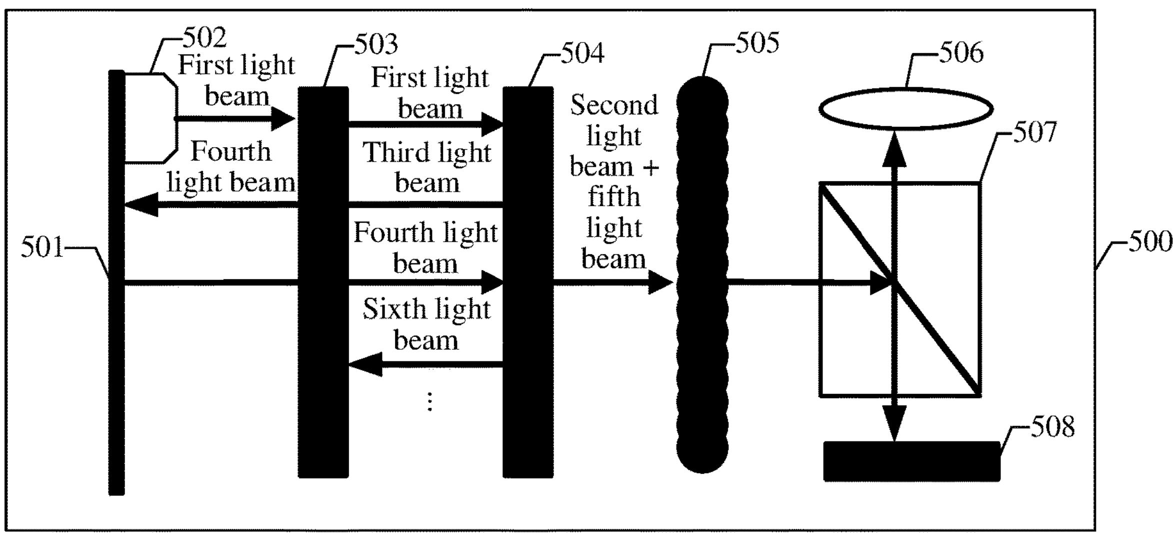
FIG. 5 is another schematic diagram of a structure of a light beam processing apparatus according to an embodiment of this application.

It should be noted that, referring to FIG. 5, a structure of a light beam processing apparatus 500 in embodiments of this application may not include an integrator lens. A fly's-eye lens 505 is similar to the fly's-eye lens 204 in the embodiment shown in FIG. 2, and details are not described herein again.

Figure 6:
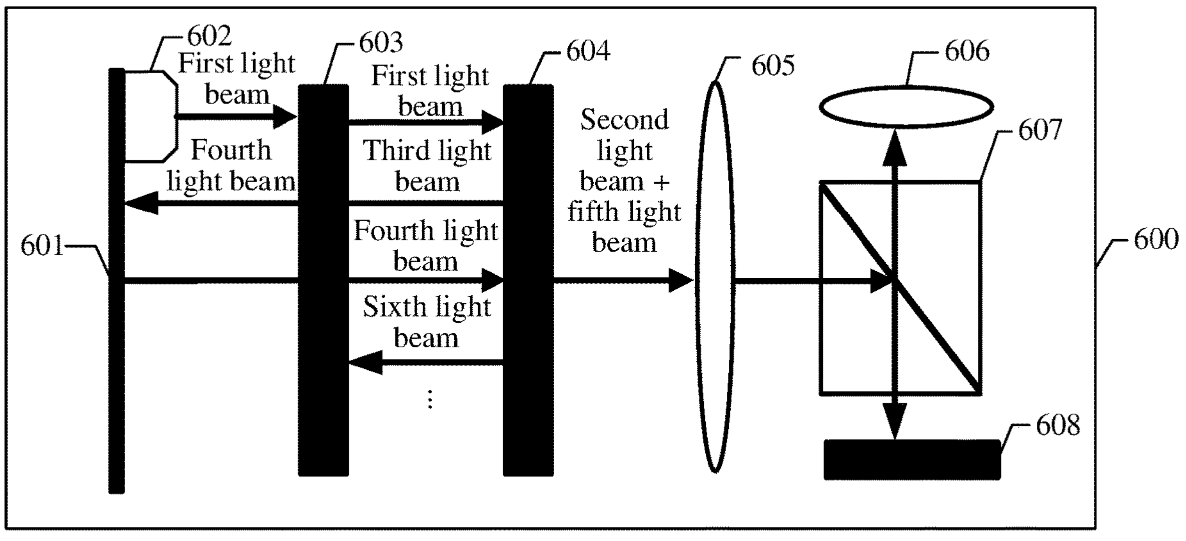
FIG. 6 is another schematic diagram of a structure of a light beam processing apparatus according to an embodiment of this application.

Alternatively, referring to FIG. 6, a structure of a light beam processing apparatus 600 in embodiments of this application may not include a fly's-eye lens. An integrator lens 605 is similar to the integrator lens 304 in the embodiment shown in FIG. 3, and details are not described herein again.

It should be noted that, the first polarization state is a P polarization state, and the second polarization state is an S polarization state. Alternatively, the first polarization state is an S polarization state, and the second polarization state is a P polarization state. This is not specifically limited herein. The light source 402, a light source 502, and a light source 602 may be light-emitting diodes, or may be semiconductor laser emitters. This is not specifically limited herein. Light emitting directions of the light source 402, the light source 502, and the light source 602 are parallel to a transmission direction of the first light beam. The polarizer 404, a polarizer 504, and a polarizer 604 may be a multi-layer thin film polarizer or a metal wire grate polarizer. This is not specifically limited herein.

In embodiments of this application, the polarizer may reflect a light beam in the second polarization state to the depolarizer, and the light beam in the second polarization state is converted by the depolarizer into a light beam in the first polarization state and a light beam in the second polarization state, to continuously obtain light beams in the first polarization state. This improves utilization of the light beam provided by the light source.

The following describes a structure in which a polarization converter is a ¼ wave plate in a light beam processing apparatus according to embodiments of this application.

Figure 7:
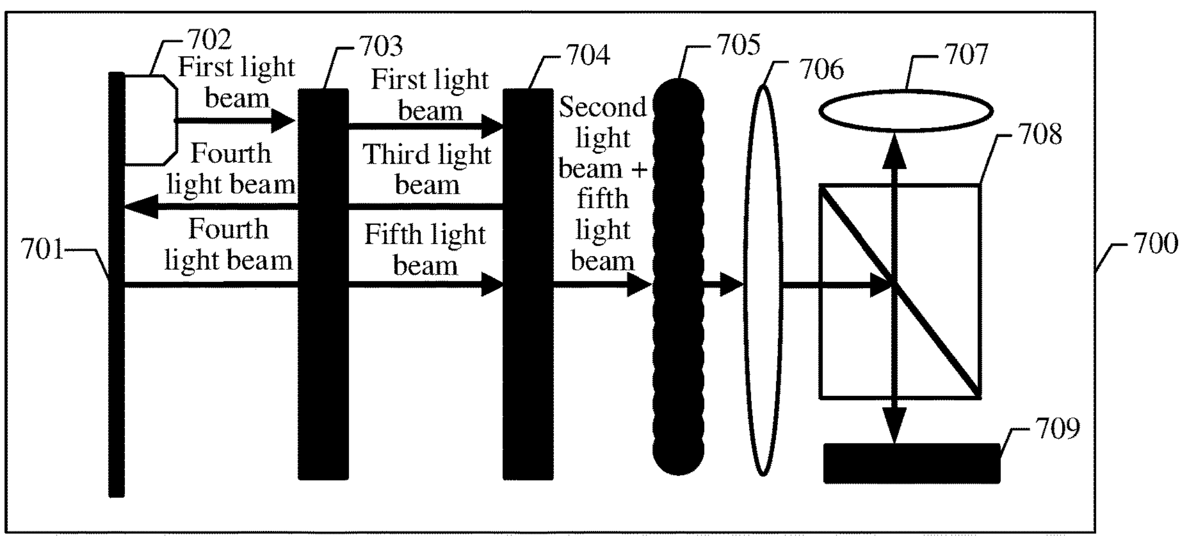
FIG. 7 is another schematic diagram of a structure of a light beam processing apparatus according to an embodiment of this application.

Referring to FIG. 7, a structure of a light beam processing apparatus 700 in embodiments of this application includes a light source 702, a reflection coating 701, a quarter-wave plate 703, a polarizer 704, a fly's-eye lens 705, an integrator lens 706, a polarized light splitter 708, a projection lens 707, and a liquid crystal on silicon 709, where an opto-mechanical system includes the polarized light splitter 708 and the liquid crystal on silicon 709.

As shown in FIG. 7, the light source 702 provides a first light beam, where the first light beam includes a second light beam in a first polarization state and a third light beam in a second polarization state.

The first light beam is transmitted from the light source 702 to the quarter-wave plate 703 and then to the polarizer 704. The polarizer transmits a second light beam and reflects a third light beam to a quarter-wave plate. The quarter-wave plate may convert the third light beam into a circularly polarized light beam, and the circularly polarized light beam is a fourth light beam. The fourth light beam is transmitted to a reflection coating disposed at the light source, the reflection coating reflects the fourth light beam to the quarter-wave plate, and the quarter-wave plate converts the fourth light beam into a fifth light beam in the first polarization state.

The fifth light beam is transmitted to the polarizer 704, and the polarizer 704 transmits the fifth light beam.

Still referring to FIG. 7, the second light beam and the fifth light beam transmitted by the polarizer 704, that is, light beams in the first polarization state, are transmitted from the polarizer 704 to the fly's-eye lens 705, and then to the integrator lens 706. The fly's-eye lens 705 is similar to the fly's-eye lens 104 in the embodiment shown in FIG. 1*b*, and the integrator lens 706 is similar to the integrator lens 105 in the embodiment shown in FIG. 1*b*. Details are not described herein again.

After a focused second light beam and a focused fifth light beam are transmitted to the opto-mechanical system, the polarized light splitter reflects the focused second light beam and the focused fifth light beam to the liquid crystal on silicon. The liquid crystal on silicon performs pixel-level polarization state processing on the focused second light beam and the focused fifth light beam based on an actually required image, to modulate a to-be-displayed image into a second light beam and a fifth light beam on which the polarization state processing is performed. A specific modulation manner is similar to the modulation manner in the embodiment shown in FIG. 1*b*, and details are not described herein again.

Figure 8:
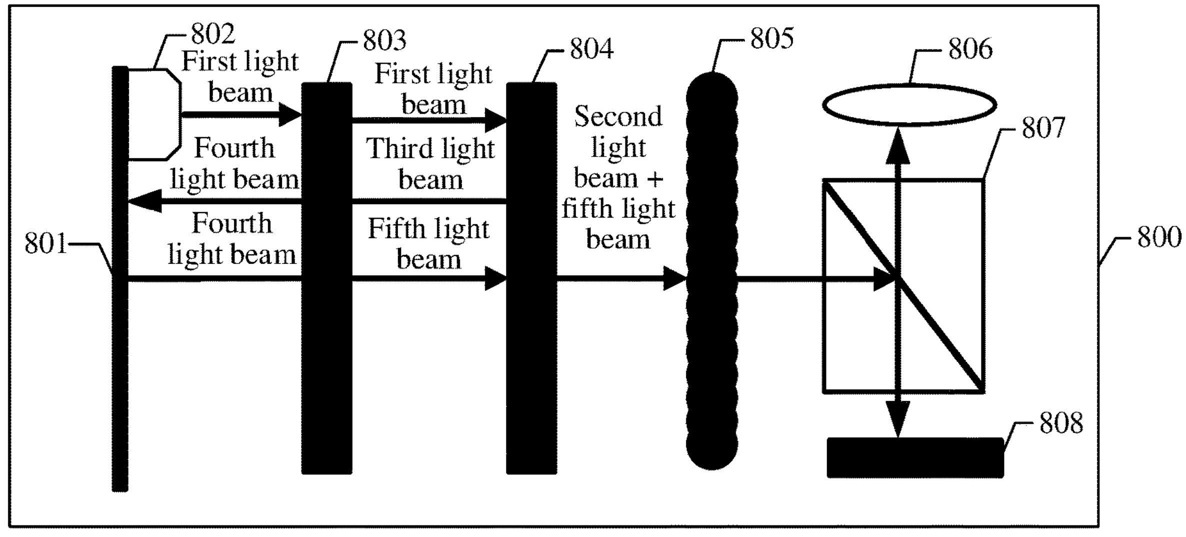
FIG. 8 is another schematic diagram of a structure of a light beam processing apparatus according to an embodiment of this application.

It should be noted that, referring to FIG. 8, a structure of a light beam processing apparatus 800 in embodiments of this application may not include an integrator lens, and a fly's-eye lens 805 is similar to the fly's-eye lens 204 in the embodiment shown in FIG. 2. Details are not described herein again.

Figure 9:
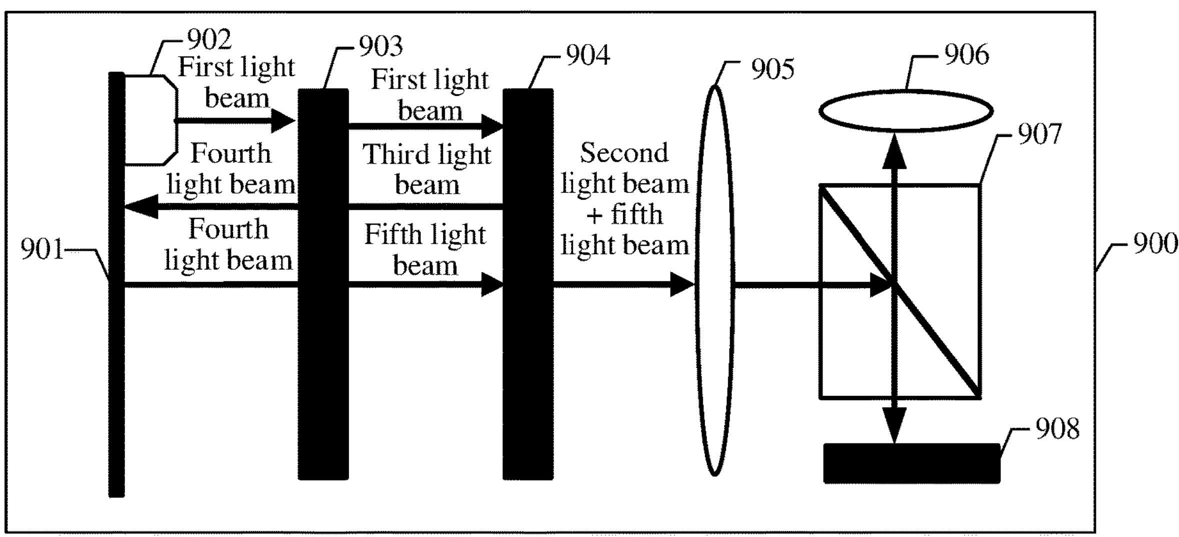
FIG. 9 is another schematic diagram of a structure of a light beam processing apparatus according to an embodiment of this application.

Alternatively, referring to FIG. 9, a structure of a light beam processing apparatus 900 in embodiments of this application may not include a fly's-eye lens. An integrator lens 905 is similar to the integrator lens 304 in the embodiment shown in FIG. 3. Details are not described herein again.

It should be noted that, the first polarization state is a P polarization state, and the second polarization state is an S polarization state. Alternatively, the first polarization state is an S polarization state, and the second polarization state is a P polarization state. This is not specifically limited herein. The light source 702, a light source 802, and a light source 902 may be light-emitting diodes, or may be semiconductor laser emitters. This is not specifically limited herein. Light emitting directions of the light sources 702, 802, and 902 are parallel to a transmission direction of the first light beam. The polarizer 704, a polarizer 804, and a polarizer 904 may be a multi-layer thin film polarizer or a metal wire grate polarizer. This is not specifically limited herein.

In embodiments of this application, the polarizer may reflect a light beam in the second polarization state to the quarter-wave plate, and the light beam in the second polarization state is first converted into the circularly polarized light beam by the quarter-wave plate. Then, the quarter-wave plate converts all of the circularly polarized light beams into the light beams in the first polarization state, to obtain light beams in the first polarization state. This improves utilization of the light beam provided by the light source.

The foregoing describes a light beam processing apparatus in embodiments of this application. The following describes a light beam processing method in embodiments of this application. The light beam processing method in embodiments of this application may be divided into a polarization state conversion phase and a light beam modulation phase. The following first describes the polarization state conversion phase.

Figure 10:
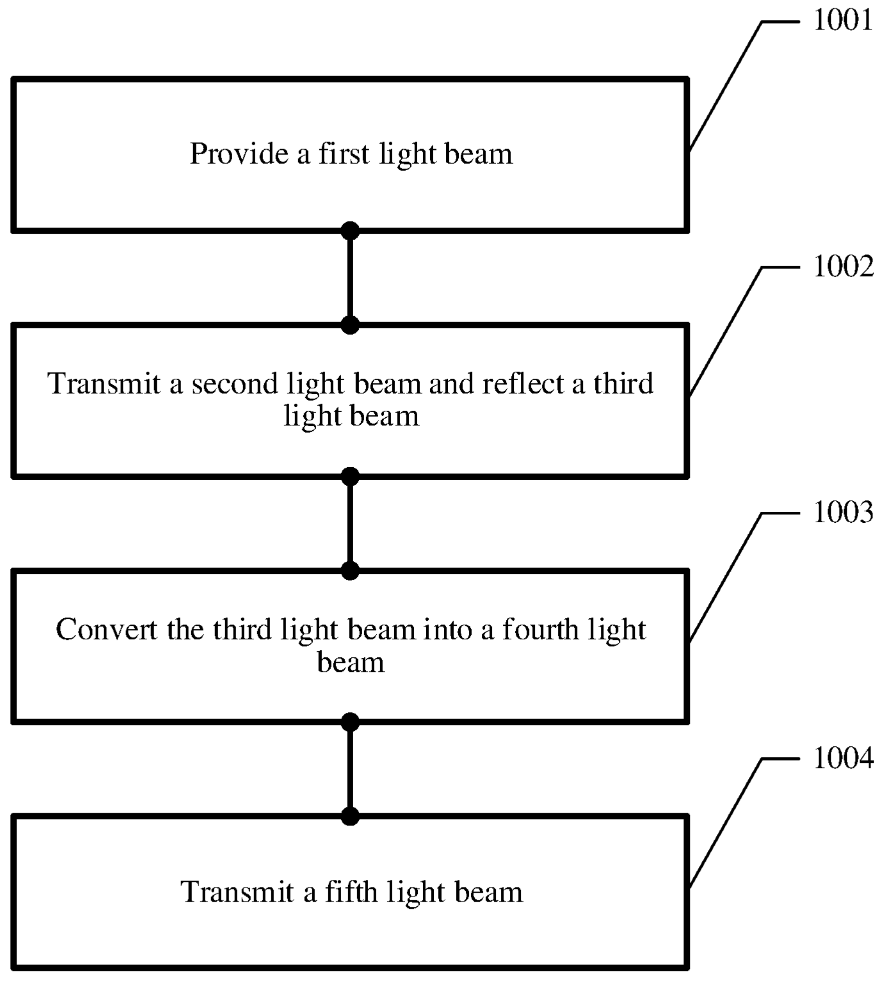
FIG. 10 is a schematic flowchart of a light beam processing method according to an embodiment of this application.

Referring to FIG. 10, a procedure of the polarization state conversion phase of the light beam processing method according to embodiments of this application includes the following steps.

1001. Provide a first light beam.

Specifically, the first light beam may be provided by a light source, and the first light beam includes a second light beam in a first polarization state and a third light beam in a second polarization state.

1002. Transmit the second light beam and reflect the third light beam.

The second light beam is transmitted, and the third light beam is reflected.

1003. Convert the third light beam into a fourth light beam.

After the third light beam is reflected, the third light beam is converted into the fourth light beam, where the fourth light beam is for obtaining a fifth light beam in the first polarization state.

1004. Transmit the fifth light beam.

After the fifth light beam is obtained, the fifth light beam is transmitted.

In embodiments of this application, the third light beam in the second polarization state is converted into the fourth light beam, and the fifth light beam in the first polarization state is obtained based on the fourth light beam. Because a liquid crystal on silicon usually modulates a light beam in the first polarization state, utilization of the light beam is improved through polarization state conversion in this application.

Figure 11:
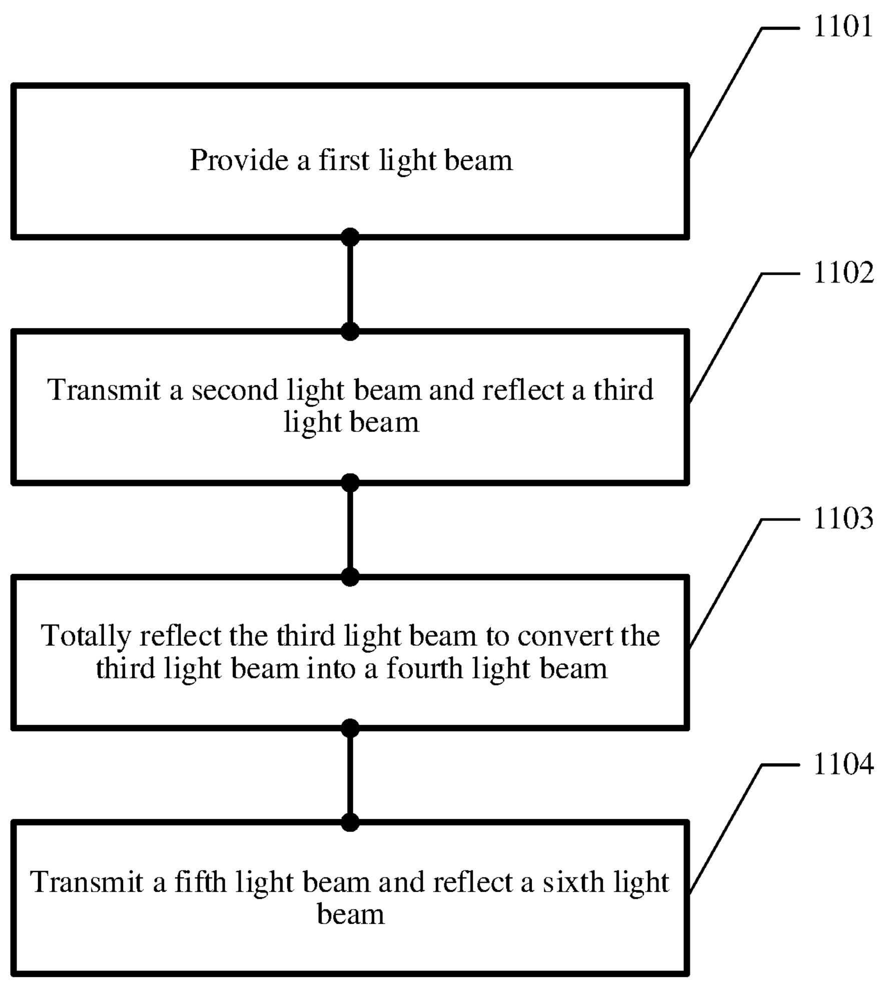
FIG. 11 is another schematic flowchart of a light beam processing method according to an embodiment of this application.

Referring to FIG. 11, another procedure of the polarization state conversion phase of the light beam processing method according to embodiments of this application includes the following steps.

1101. Provide a first light beam.

Specifically, the first light beam may be provided by a light source, and the first light beam includes a second light beam in a first polarization state and a third light beam in a second polarization state.

1102. Transmit the second light beam and reflect the third light beam.

The second light beam is transmitted, and the third light beam is reflected.

1103. Totally reflect the third light beam, to convert the third light beam into a fourth light beam.

The reflected third light beam is totally reflected, and a polarization state of the third light beam gradually changes during total reflection, to convert the third light beam into the fourth light beam, where the fourth light beam includes a fifth light beam in the first polarization state and a sixth light beam in the second polarization state.

1104. Transmit the fifth light beam and reflect the sixth light beam.

After the third light beam is converted into the fourth light beam, the fifth light beam is transmitted, and the sixth light beam is reflected.

In embodiments of this application, the third light beam in the second polarization state undergoes polarization state conversion through a plurality of times of total reflection, so that the light beam in the first polarization state can be obtained. This improves utilization of the light beam.

Figure 12:
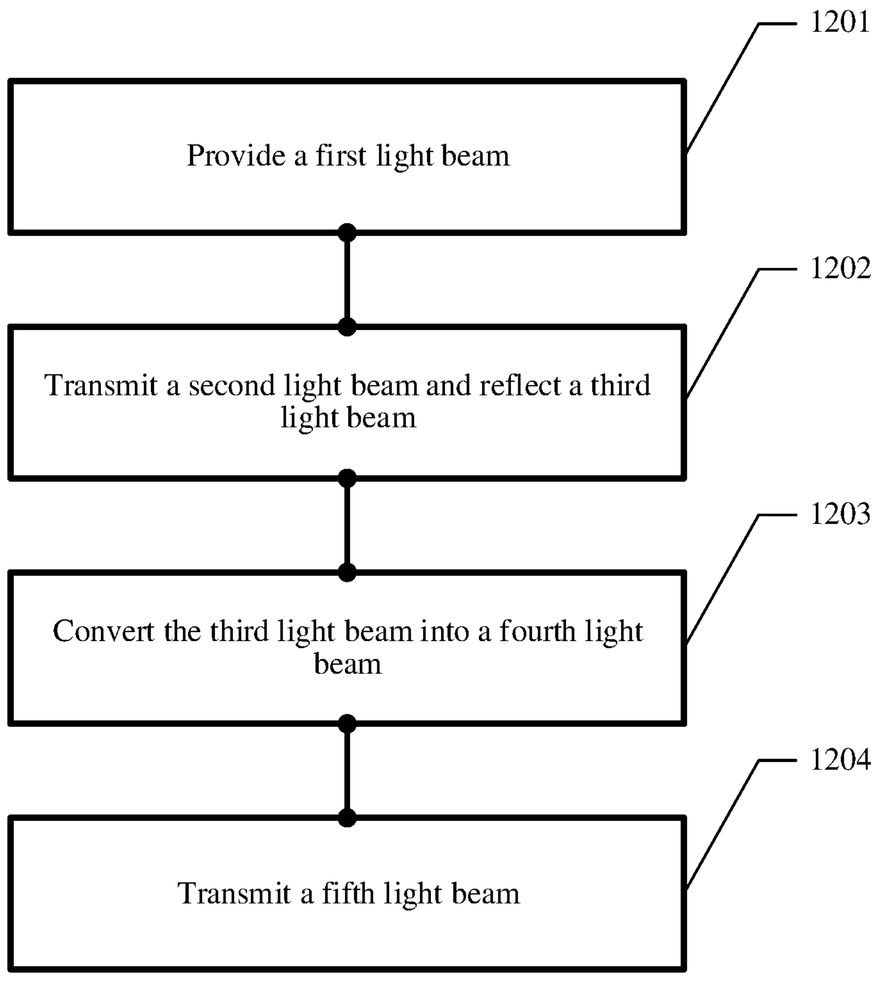
FIG. 12 is another schematic flowchart of a light beam processing method according to an embodiment of this application.

Referring to FIG. 12, another procedure of the polarization state conversion phase of the light beam processing method according to embodiments of this application includes the following steps.

Step 1201 and step 1202 in the embodiment are similar to step 1001 and step 1002 in the embodiment shown in FIG. 10, and details are not described herein again.

1203. Convert the third light beam into a fourth light beam.

The third light beam is converted into the fourth light beam, where the fourth light beam includes a fifth light beam in a first polarization state and a sixth light beam in a second polarization state.

1204. Transmit the fifth light beam and reflect the sixth light beam.

After the third light beam is converted into the fourth light beam, the fifth light beam is transmitted, and the sixth light beam is reflected.

Figure 13:
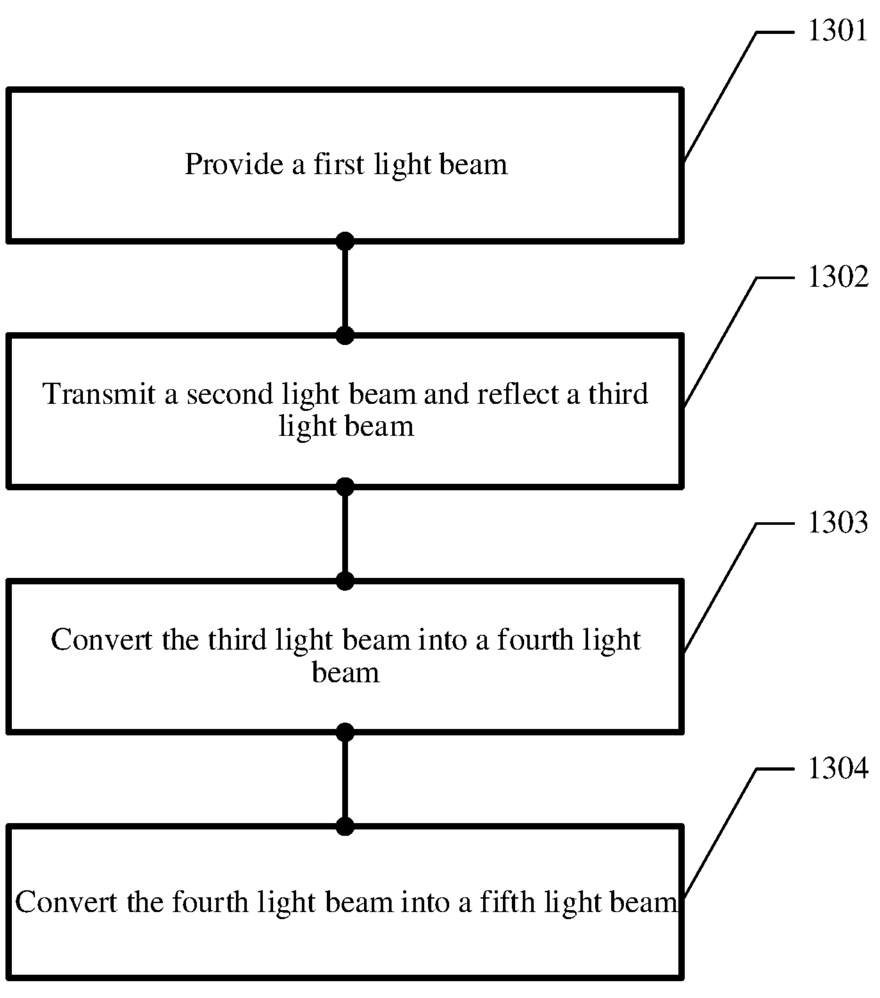
FIG. 13 is another schematic flowchart of a light beam processing method according to an embodiment of this application.

Referring to FIG. 13, another procedure of the polarization state conversion phase of the light beam processing method according to embodiments of this application includes the following steps.

Step 1301 and step 1302 in the embodiment are similar, and details are not described herein again.

1303. Convert a third light beam into a fourth light beam.

The reflected third light beam is converted into a fourth light beam, where the fourth light beam is a circularly polarized light beam.

1304. Convert the fourth light beam into a fifth light beam.

The fourth light beam, which is a circularly polarized light beam, is converted into the fifth light beam, where the fifth light beam is in a first polarization state.

In embodiments of this application, the third light beam is first converted into the circularly polarized light beam, and then the circularly polarized light beam is directly converted into the fifth light beam in the first polarization state. This improves utilization of the light beam.

Figure 14:
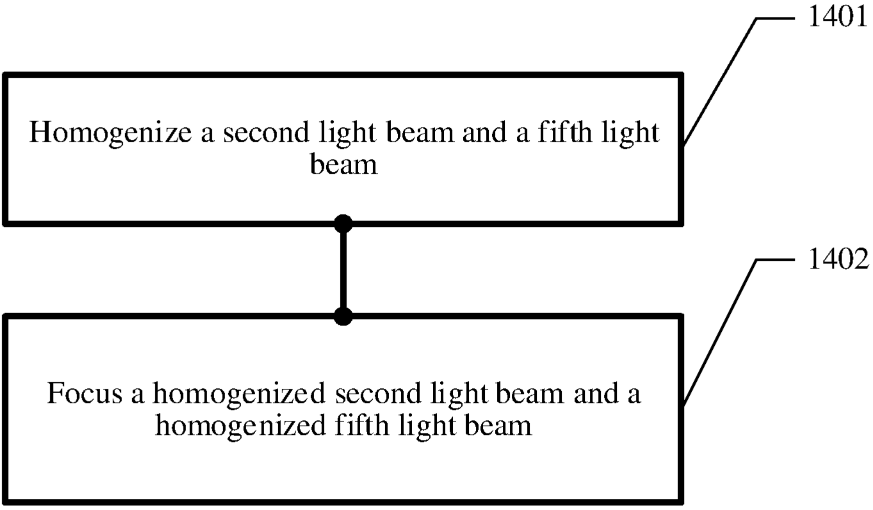
FIG. 14 is another schematic flowchart of a light beam processing method according to an embodiment of this application.

The polarization state conversion phase of the light beam processing method in embodiments of this application is described above. Based on the polarization conversion phase shown in FIG. 10 to FIG. 13, referring to FIG. 14, the following describes a light beam modulation phase of the light beam processing method in embodiments of this application.

1401. Homogenize a second light beam and a fifth light beam.

After the second light beam and the fifth light beam are obtained in the polarization state conversion phase, the second light beam and the fifth light beam are homogenized, to obtain a homogenized second light beam and a homogenized fifth light beam.

It should be noted that, this step is an optional step, during actual implementation, the second light beam and the fifth light beam may not be homogenized. This is not specifically limited herein.

1402. Focus the homogenized second light beam and the homogenized fifth light beam, to obtain a focused second light beam and a focused fifth light beam.

After the second light beam and the fifth light beam are homogenized, the homogenized second light beam and the homogenized fifth light beam are focused, to obtain the focused second light beam and the focused fifth light beam.

It should be noted that, this step is an optional step. During actual implementation, the homogenized second light beam and the homogenized fifth light beam may not be focused. During actual implementation, if step 1401 is skipped, in this step, the second light beam and the fifth light beam are focused directly, to obtain the focused second light beam and the focused fifth light beam.

1403. Modulate the focused second light beam and the focused fifth light beam.

After the focused second light beam and the focused fifth light beam are obtained, the focused second light beam and the focused fifth light beam are modulated. Specifically, pixel-level polarization state adjustment is performed on the focused second light beam and the focused fifth light beam based on an image that needs to be obtained.

It should be noted that, during actual implementation, if step 1402 is not performed, only step 1401 is performed. In this step, the homogenized second light beam and the homogenized fifth light beam may be modulated.

Figure 15:
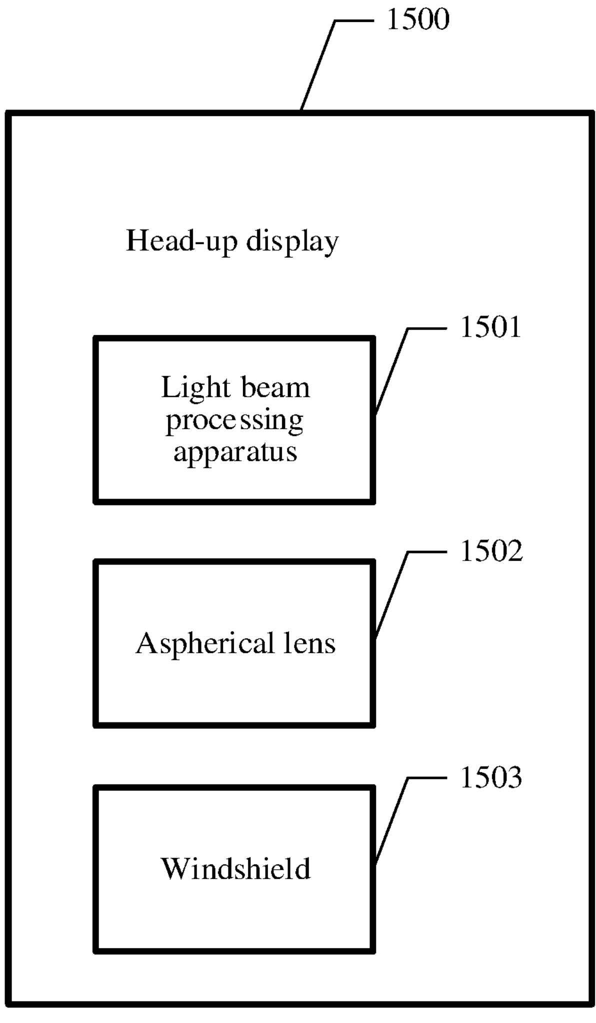
FIG. 15 is a schematic diagram of a structure of a head-up display according to an embodiment of this application.

The following describes a head-up display in embodiments of this application. Referring to FIG. 15, a head-up display 1500 in embodiments of this application includes a light beam processing apparatus 1501, an aspherical lens 1502, and a windshield 1503.

Figure 16:
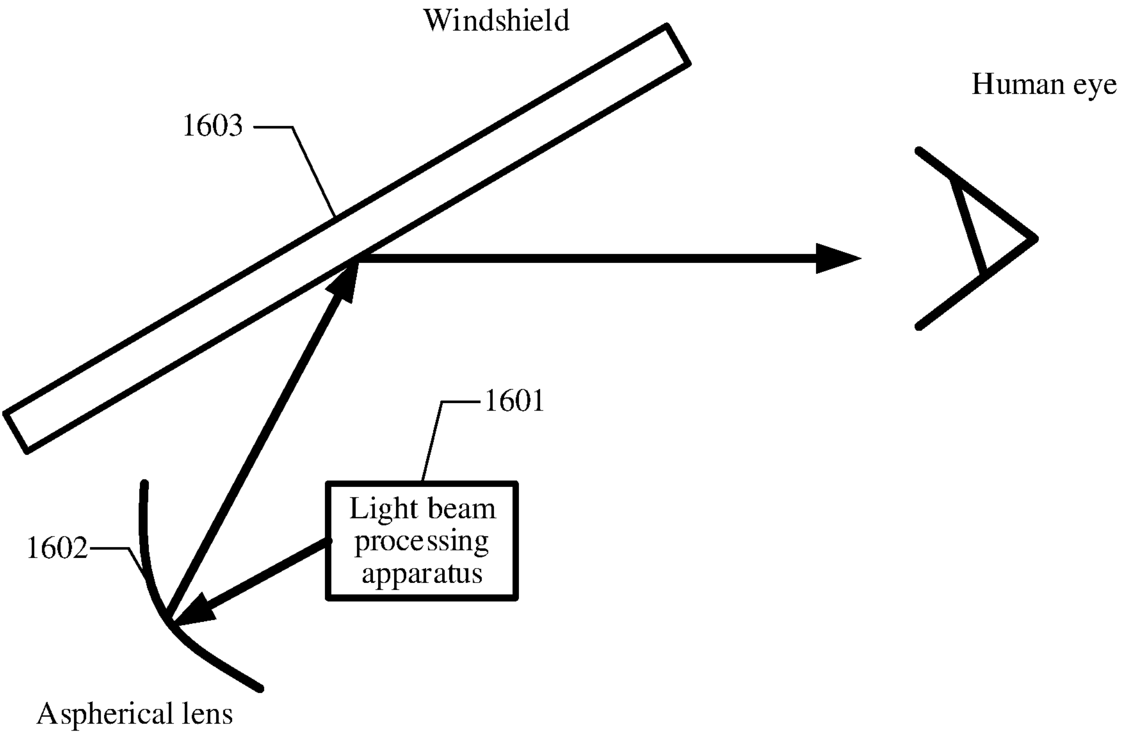
FIG. 16 is a schematic diagram of an application scenario of a head-up display according to an embodiment of this application.

Referring to FIG. 16, the following describes an operating manner of a head-up display in embodiments of this application. As shown in FIG. 16, a light beam processing apparatus 1601 projects a light beam onto an aspherical lens 1602, and the aspherical lens 1602 reflects the light beam onto a windshield 1603. The windshield 1603 reflects the light beam to the external, and is captured by the human eye.

Specific examples are used in this specification to describe principles and implementations of this application. Descriptions of the foregoing embodiments are merely used to help understand the method and core ideas of this application. In addition, a person of ordinary skill in the art may make modifications to the specific implementations and the application scope according to the idea of this application. In conclusion, the content of this specification shall not be construed as a limitation on this application.

What is claimed is:

1. A light beam processing apparatus comprising:
a light source,
a polarization converter, and
a polarizer;
wherein the light source is configured to provide a first light beam that comprises:
a second light beam in a first polarization state; and
a third light beam in a second polarization state,
wherein the first polarization state and the second polarization state are orthogonal to each other, and
wherein the first light beam is transmitted to the polarizer;
wherein the polarizer is configured to transmit the second light beam and reflect the third light beam to the polarization converter,
wherein the polarization converter is configured to convert the third light beam into a fourth light beam that is used for obtaining a fifth light beam in the first polarization state,
wherein the polarizer is further configured to transmit the fifth light beam,
wherein the polarization converter is a depolarizer, and the fourth light beam comprises the fifth light beam and a sixth light beam that is in the second polarization state;
wherein the polarizer is further configured to reflect the sixth light beam to the depolarizer, and
wherein the light beam processing apparatus further comprises a fly's-eye lens that is configured to homogenize the second light beam and the fifth light beam, to obtain a homogenized second light beam and a homogenized fifth light beam.

2. The light beam processing apparatus according to claim 1, wherein the light beam processing apparatus further comprises an integrator lens that is configured to:
focus the second light beam and the fifth light beam, to obtain a focused second light beam and a focused fifth light beam; or
focus the homogenized second light beam and the homogenized fifth light beam, to obtain a focused second light beam and a focused fifth light beam.

3. The light beam processing apparatus according to claim 2, wherein the light beam processing apparatus further comprises an opto-mechanical system that is configured to:
modulate the focused second light beam and the focused fifth light beam; or
modulate the homogenized second light beam and the homogenized fifth light beam.

4. A display system, comprising:
a light beam processing apparatus that comprises a light source, a polarization converter, and a polarizer;
wherein the light source is configured to provide a first light beam that comprises:
a second light beam in a first polarization state; and
a third light beam in a second polarization state,
wherein the first polarization state and the second polarization state are orthogonal to each other, and
wherein the first light beam is transmitted to the polarizer;
wherein the polarizer is configured to transmit the second light beam and reflect the third light beam to the polarization converter,
wherein the polarization converter is configured to convert the third light beam into a fourth light beam that is used for obtaining a fifth light beam in the first polarization state,
wherein the polarizer is further configured to transmit the fifth light beam,
wherein the polarization converter is a depolarizer, and the fourth light beam comprises the fifth light beam and a sixth light beam that is in the second polarization state;
wherein the polarizer is further configured to reflect the sixth light beam to the depolarizer, and
wherein the light beam processing apparatus further comprises a fly's-eye lens that is configured to homogenize the second light beam and the fifth light beam, to obtain a homogenized second light beam and a homogenized fifth light beam; and
a reflection apparatus that is configured to reflect a light beam projected by the light beam processing apparatus.

5. The display system according to claim 4, wherein
the reflection apparatus comprises an aspherical lens and/or a windshield.

6. The display system according to claim 4, wherein the light beam processing apparatus further comprises an integrator lens that is configured to:
focus the second light beam and the fifth light beam, to obtain a focused second light beam and a focused fifth light beam; or
focus the homogenized second light beam and the homogenized fifth light beam, to obtain a focused second light beam and a focused fifth light beam.

7. The display system according to claim 6, wherein the light beam processing apparatus further comprises an opto-mechanical system that is configured to:
modulate the focused second light beam and the focused fifth light beam; or modulate the homogenized second light beam and the homogenized fifth light beam.

8. A light beam processing method, carried out by a light beam processing apparatus comprising a light source, a polarization converter and a polarizer, the method comprising:

providing, using the light source, a first light beam that comprises;

a second light beam in a first polarization state, and a third light beam in a second polarization state, wherein the first polarization state and the second polarization state are orthogonal to each other, and wherein the first light beam is transmitted to the polarizer;

transmitting the second light beam and reflecting the third light beam to the polarization converter, using the polarizer;

converting, using the polarization converter, the third light beam into a fourth light beam that is used for obtaining a fifth light beam in the first polarization state; and transmitting, using the polarizer, the fifth light beam, wherein the polarization converter is a depolarizer, and the fourth light beam comprises the fifth light beam and a sixth light beam that is in the second polarization state;

wherein the method further comprises:

reflecting, using the polarizer, the sixth light beam to the depolarizer, and homogenizing, using a fly's-eye lens, the second light beam and the fifth light beam, to obtain a homogenized second light beam and a homogenized fifth light beam.

9. The method according to claim 8, wherein the converting the third light beam into a fourth light beam in the first polarization state comprises:

totally reflecting the third light beam, to convert the third light beam into the fourth light beam, wherein the fourth light beam comprises the fifth light beam and a sixth light beam that is in the second polarization state; and wherein the method further comprises reflecting the sixth light beam.

10. The method according to claim 8, wherein the fourth light beam comprises the fifth light beam and a sixth light beam that is in the second polarization state; and wherein the method further comprises reflecting the sixth light beam.

11. The method according to claim 8, wherein the converting the third light beam into a fourth light beam comprises converting the third light beam into the fourth light beam, wherein the fourth light beam is a circularly polarized light beam; and wherein the method further comprises converting the fourth light beam into the fifth light beam.

12. The method according to claim 8, wherein the light beam processing apparatus further comprises an integrator lens that is configured to:

focus the second light beam and the fifth light beam, to obtain a focused second light beam and a focused fifth light beam; or focus the homogenized second light beam and the homogenized fifth light beam, to obtain a focused second light beam and a focused fifth light beam.

13. The method according to claim 12, wherein the light beam processing apparatus further comprises an opto-mechanical system that is configured to:

modulate the focused second light beam and the focused fifth light beam; or modulate the homogenized second light beam and the homogenized fifth light beam.

* * * * *